(12) United States Patent
Lee

(10) Patent No.: US 8,281,802 B2
(45) Date of Patent: Oct. 9, 2012

(54) VALVE FOR ANTI-LOCK BRAKE SYSTEM

(75) Inventor: Chung Jae Lee, Gyeonggi-do (KR)

(73) Assignee: Mando Corporation, Gyeonggi-do (KR)

( * ) Notice: Subject to any disclaimer, the term of this patent is extended or adjusted under 35 U.S.C. 154(b) by 1244 days.

(21) Appl. No.: 12/048,468

(22) Filed: Mar. 14, 2008

(65) Prior Publication Data

US 2008/0237524 A1 Oct. 2, 2008

(30) Foreign Application Priority Data

Mar. 27, 2007 (KR) .......................... 10-2007-0029754
Mar. 30, 2007 (KR) .......................... 10-2007-0031368
Oct. 11, 2007 (KR) .......................... 10-2007-0102358

(51) Int. Cl.
*F16K 25/00* (2006.01)
*F16K 31/06* (2006.01)
*F16K 31/12* (2006.01)
(52) U.S. Cl. .................... 137/454.2; 251/30.04
(58) Field of Classification Search ............... 251/30.04, 251/30.05; 137/454.2, 454.5
See application file for complete search history.

(56) References Cited

U.S. PATENT DOCUMENTS

| | | | | |
|---|---|---|---|---|
| 2,658,716 A | * | 11/1953 | Winfree ......................... | 251/273 |
| 4,494,726 A | * | 1/1985 | Kumar et al. .................... | 251/29 |
| 5,180,138 A | * | 1/1993 | Moldenhauer ............. | 251/30.05 |
| 5,423,347 A | * | 6/1995 | Weber ......................... | 137/454.5 |
| 5,810,330 A | * | 9/1998 | Eith et al. .................. | 251/129.19 |
| 5,865,213 A | * | 2/1999 | Scheffel et al. ........... | 137/614.16 |
| 6,254,200 B1 | * | 7/2001 | Ganzel ......................... | 303/119.2 |
| 6,435,210 B1 | * | 8/2002 | Obersteiner et al. ...... | 137/599.18 |
| 6,481,452 B2 | * | 11/2002 | Reuter et al. ..................... | 137/14 |
| 6,796,619 B1 | * | 9/2004 | Hinz et al. .................. | 303/119.2 |
| 7,198,249 B2 | * | 4/2007 | Nakayasu .................. | 251/30.04 |
| 7,309,113 B2 | * | 12/2007 | Carter ......................... | 303/119.1 |

(Continued)

FOREIGN PATENT DOCUMENTS

CN 1181996 A 5/1998

(Continued)

OTHER PUBLICATIONS

Machine translation of DE102004018677.*

(Continued)

*Primary Examiner* — Stephen M Hepperle
*Assistant Examiner* — Jonathan Waddy
(74) *Attorney, Agent, or Firm* — McDermott Will & Emery LLP

(57) ABSTRACT

A valve for an anti-lock brake system is capable of reducing the cost of production through structural improvement of a valve housing. The valve includes a valve core, an armature located below the valve core and having a ball, a cylindrical sleeve coupled to the valve core and armature and guiding the armature to move backward and forward, a first elastic member installed between the valve core and the armature, a valve housing coupled to the sleeve and having a longitudinal hollow space, a seat plunger movably installed in the hollow space and having a first orifice, a second elastic member installed between the seat plunger and the valve housing, a seat having an outlet and a second orifice that communicates with the first orifice, and a seat housing coupled to the valve housing and the seat, supporting the valve housing and the seat spaced apart from each other, and having an inlet between the valve housing and the seat.

11 Claims, 4 Drawing Sheets

U.S. PATENT DOCUMENTS 7,866,625 B2 * 1/2011 Lee et al. .................. 251/30.04
2003/0213928 A1 * 11/2003 Masuda et al. ........... 251/129.15

FOREIGN PATENT DOCUMENTS

| DE | 102004022820 A1 * | 4/2005 |
| DE | 102004018677 | 11/2005 |
| DE | 10 2005 044 666 A1 | 3/2007 |
| EP | 1363057 A2 | 11/2003 |
| JP | 10-082478 | 3/1998 |

OTHER PUBLICATIONS

Chinese Office Action issued in Chinese Patent Application No. 200810086312.3, mailed Mar. 24, 2011.

Chinese Office Action issued in Chinese Patent Application No. 200810086312.3, mailed Aug. 31, 2010.

* cited by examiner

VALVE FOR ANTI-LOCK BRAKE SYSTEM

CROSS-REFERENCE TO RELATED APPLICATIONS

This application claims the benefit of Korean Patent Application Nos. 10-2007-0029754 filed on Mar. 27, 2007, Nos. 10-2007-31368 filed on Mar. 30, 2007, and 10-2007-102358 filed on Oct. 11, 2007 in the Korean Intellectual Property Office, the disclosure of which is incorporated herein by reference.

BACKGROUND OF THE INVENTION

1. Field of the Invention

The present invention relates to a valve for an anti-lock brake system. More particularly, to a valve for an anti-lock brake system, capable of reducing the cost of production through structural improvement of a valve housing.

2. Description of the Related Art

In general hydraulic brakes of vehicles, hydraulic pressure is applied to a master cylinder by operation of a brake pedal, and thereby braking is carried out. At this time, when braking force greater than static frictional force between a road surface and a tire is applied to the tire, there occurs a slip phenomenon in which the tire slides on the road surface.

However, since a kinetic frictional coefficient is smaller than a static frictional coefficient, this slip phenomenon must be prevented in order to ensure optimal braking. Further, a steering wheel locking phenomenon that makes it impossible to control a steering wheel when the brake is operated must be prevented.

Thus, it is an anti-lock brake system that controls the hydraulic pressure applied to the master cylinder to prevent these phenomena. The anti-lock brake system basically comprises a plurality of solenoid valves, an electronic control unit (ECU) for controlling the solenoid valves, an accumulator, and a hydraulic pump.

Referring to FIG. 1, a conventional solenoid valve is installed on a modulator block 1 in order to increase compaction, and a valve bore 2 is bored in the modulator block 1 such that a valve can be installed.

A hollow valve housing 3 having an inlet 3a and an outlet 3b, both of which are connected with inner channels of the modulator block 1, is installed in the valve bore 2.

A cylindrical sleeve 5 is coupled to one end of the valve housing 3 such that an armature 4 can move backward and forward in the cylindrical sleeve. The sleeve 5 is coupled with a valve core 6 at an open end thereof, in which the valve core 6 functions to close the open end of the sleeve 5 and move the armature 4 backward and forward.

Further, the armature 4 extends toward a valve seat 7 in a hollow space so as to shut off and close an orifice 7a of the valve seat 7 through backward and forward movement. At this time, an elastic member 8 applying elastic force to the armature 4 is installed between the armature 4 and the valve core 6.

This conventional solenoid valve has a structure in which the valve housing 3 has the inlet 3a and the outlet 3b serving as an inflow port and an outflow port and includes the valve seat 7 press-fitted thereinto.

However, this structure of the solenoid valve increases its entire size because the valve seat 7 is installed in the valve housing 3, and inevitably requires to machine the valve housing 3 in a complicated shape because the inlet 3a and the outlet 3b must be formed in the valve housing 3 in a radial direction and in a longitudinal direction.

Thus, the modulator block 1 is increased in size, and is accompanied with complicated machining. This serves as a factor of increasing the overall cost of production of the anti-lock brake system.

SUMMARY OF THE INVENTION

Accordingly, it is an aspect of the present invention to provide a solenoid valve for an anti-lock brake system, which provides a compact structure and a minimum machining process to reduce the cost of production.

Additional aspects and/or advantages of the invention will be set forth in part in the description which follows and, in part, will be apparent from the description, or may be learned by practice of the invention.

The foregoing and/or other aspects of the present invention are achieved by providing a valve for an anti-lock brake system, which includes a valve core, an armature located below the valve core and having a ball at one end thereof, a cylindrical sleeve coupled to outer circumferences of the valve core and the armature and guiding the armature to move backward and forward, a first elastic member installed between the valve core and the armature, a valve housing coupled to one end of the sleeve and having a longitudinal hollow space therein, a seat plunger installed in the hollow space so as to be able to move backward and forward and having a first orifice opened and closed by the ball, a second elastic member installed between the seat plunger and the valve housing, a seat having an outlet and a second orifice that is opened and closed by the backward and forward movement of the seat plunger and communicates with the first orifice, and a seat housing coupled to a lower portion of the valve housing and an outer circumference of the seat, supporting the valve housing and the seat such that valve housing and the seat are spaced apart from each other, and having an inlet between an upper end of the valve housing and a lower end of the seat.

According to an aspect of the present invention, the seat housing includes an inflow port and an outflow port connected with the inlet and the outlet in an outer circumference and at a lower portion thereof, respectively.

According to an aspect of the present invention, the seat and the valve housing are press-fitted into an inner circumference of the seat housing.

According to an aspect of the present invention, the seat housing includes a step having a decreasing width such that the seat can be press-fitted into the seat housing.

According to an aspect of the present invention, the seat housing includes a step for limiting a press-fit depth of the valve housing.

According to an aspect of the present invention, the seat plunger includes a flange at an upper end thereof, and the valve housing comprises a flange at an upper end thereof, in order to install the second elastic member.

Further, according to an aspect of the present invention, the valve further includes a guide member, which is installed in the hollow space, guides the seat plunger so as to be able to move backward and forward, and has a bent flange in order to install the second elastic member.

According to an aspect of the present invention, the seat housing is coupled with an inlet filter, which has a filter body for filtering a fluid introduced into the inlet, by press-fitting on an outer circumference thereof.

According to an aspect of the present invention, the seat housing and the inlet filter are press-fitted into a bore of a modulator block.

According to an aspect of the present invention, the sleeve includes a step on an inner circumference thereof; the valve housing has a step on an outer circumference thereof; and the sleeve is press-fitted around the outer circumference of the valve housing.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
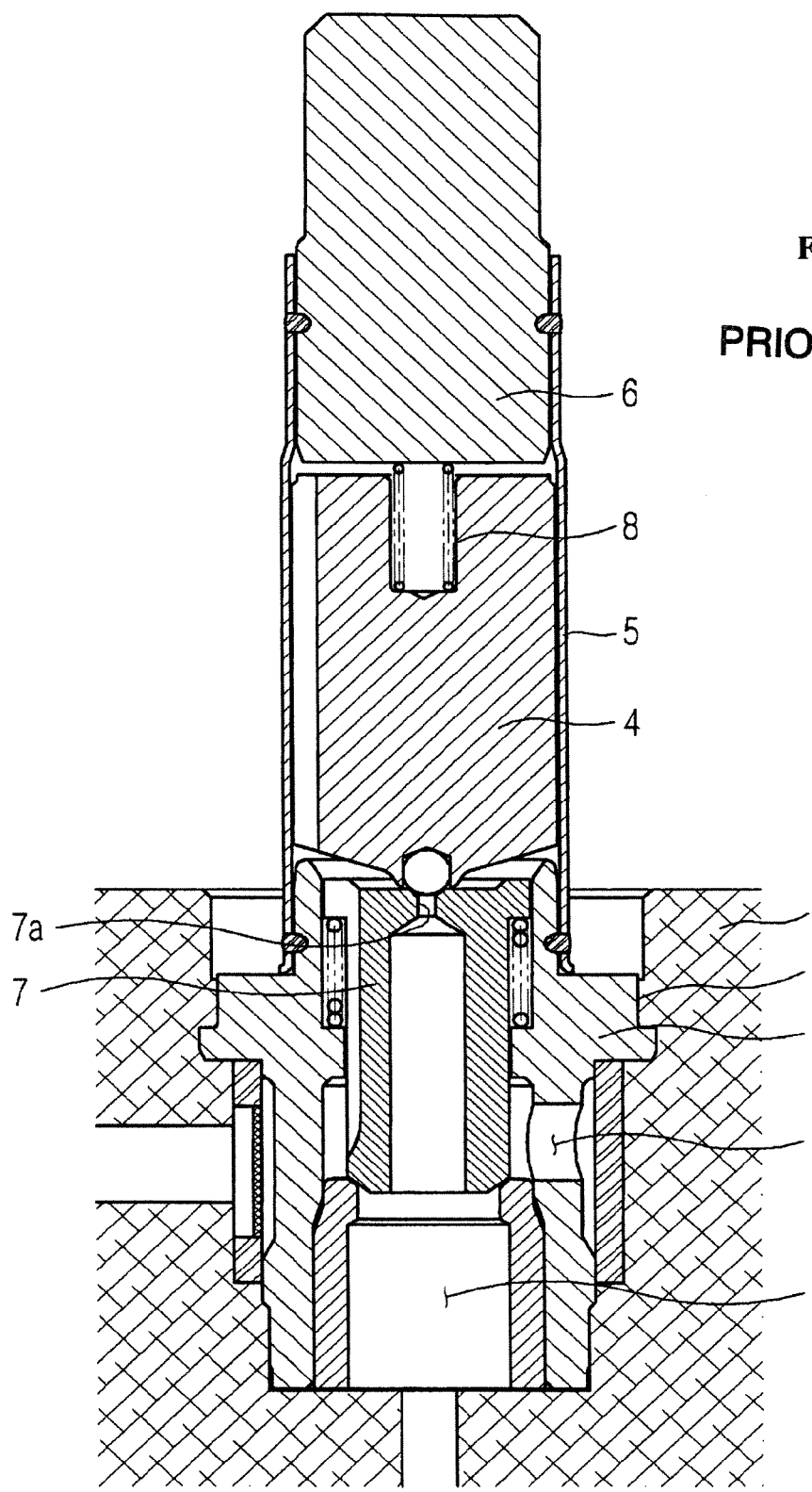
FIG. 1 is a sectional view illustrating the configuration of a known valve for an anti-lock brake system.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
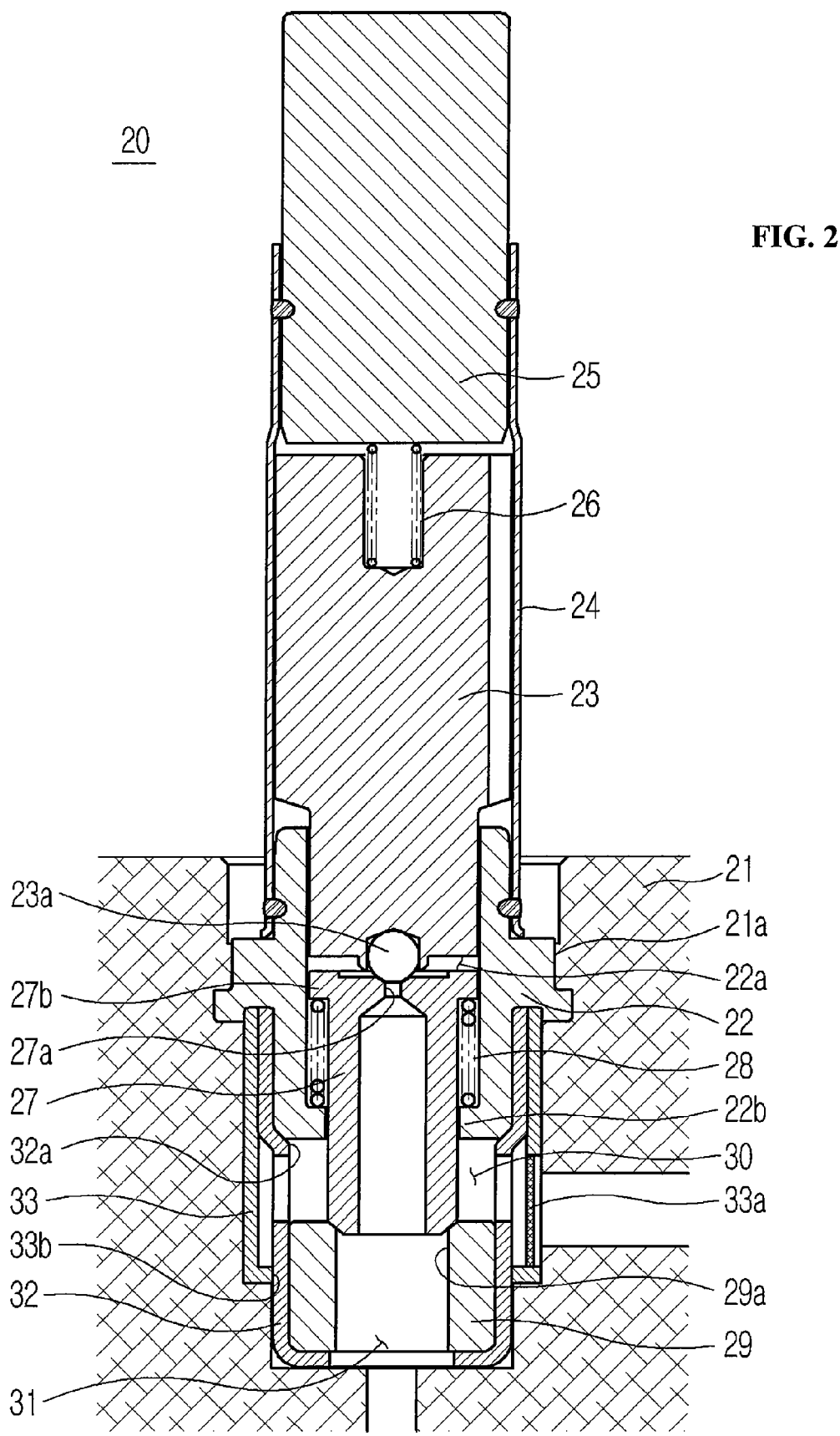
FIG. 2 is a sectional view illustrating the configuration of a valve for an anti-lock brake system according to a first embodiment of the present invention.

As illustrated in FIG. 2, a solenoid valve 20 for an anti-lock brake system according to the present invention comprises a valve housing 22, which is press-fitted into the bore 21a of a modulator block 21.

A cylindrical sleeve 24 is coupled to one end of the valve housing 22 such that an armature 23 can move backward and forward in the cylindrical sleeve. The sleeve 24 is coupled with a valve core 25 at an open end thereof, in which the valve core 25 functions not only to close the open end of the sleeve 24 but also move the armature 23 backward and forward.

A first elastic member 26 is installed between the armature 23 and the valve core 25 in order to apply elastic force to the armature 23 in a downward direction. A ball 23a is installed on a lower end of the armature 23.

The valve housing 22 has a longitudinal hollow space 22a, which guides the armature 23 so as to be able to move backward and forward, and a seat plunger 27 with a first orifice 27a below the armature 23. As the armature 23 moves backward and forward, the first orifice 27a of the seat plunger 27 is opened and closed by the ball 23a.

The seat plunger 27 is supported in the hollow space 22a so as to be able to move backward and forward like the armature 23, and particularly a second elastic member 28 is installed between a lower end of the valve housing 22 and an upper end of the seat plunger 27 in order to apply elastic force to the seat plunger 27 in an upward direction. In order to install the second elastic member 28, the lower end of the valve housing 22 and the upper end of the seat plunger 27 have steps 22b and 27b, respectively.

At this time, a modulus of elasticity of the second elastic member 28 is smaller than that of the first elastic member 26.

Further, a seat 29 is installed below the valve housing 22 so as to be spaced apart from the lower end of the valve housing 22.

The seat 29 comprises a second orifice 29a, which communicates with the first orifice 27a and is opened and closed by a lower end of the seat plunger 27. An inlet 30, inflow port, of the valve 20 is formed in a separated space between the valve housing 22 and the seat 29.

Further, the seat plunger 27 comprises a connecting channel (not shown) in a longitudinal direction such that a fluid flowing into the inlet 30 can be guided toward the ball 23a and the first orifice 27a in an upward direction.

As described above, the seat 29 is spaced apart from the valve housing 22. To this end, a seat housing 32 is coupled on outer circumferences of the valve housing 22 and the seat 29.

The seat housing 32 has the shape of a cylinder, an upper end of which is open, and comprises an inflow port 32c and an outflow port 32d, which communicate with the inlet 30 and the outlet 31 in a radial direction and in a lower portion thereof respectively.

The seat 29 is press-fitted into the lower portion of the seat housing 32. In this state, the lower portion of the valve housing 22 is press-fitted into an opening of the seat housing 32. Thereby, the seat housing 32 is assembled to be able to have a sealed structure.

At this time, in order to determine a depth at which the valve housing 22 is inserted into the seat housing 32, the seat housing 32 has a step 32a on an inner circumference thereof.

This seat housing 32 supports the seat 29 so as to be spaced apart from the valve housing, so that a machining process (e.g. cutting) for forming the inlet 30 and the outlet 31 in the valve housing 22 can be omitted. The seat housing 32 is a part that can be simply formed by deep drawing a sheet material.

Further, the outer circumference of the seat housing 32 is coupled with an inlet filter 33, which includes a filter body 33a for filtering hydraulic oil introduced into the inlet 30.

Like the seat housing 32, the inlet filter 33 is open at an upper end thereof, and is press-fitted around the outer circumference of the seat housing 32 when assembled.

At this time, the inlet filter 33 comprises an assembling hole 33b, through which the seat housing 32 can pass, in an lower end thereof in order to be assembled with the seat housing 32. The outer circumference of the seat housing 32 is press-fitted into the assembling hole 33b.

Now, a description will be made below about how the solenoid valve for an anti-lock brake system according to the present invention is opened and closed.

At normal times, the valve 20 is adapted so that, because the modulus of elasticity of the first elastic member 26 is greater than that of the second elastic member 28, the armature 23 moves forward to the seat plunger 27, and thus the first orifice 27a is closed by the ball 23a.

When the valve 20 is activated, the armature 23 moves backward to the valve core 25, and thus the first orifice 27a is opened. At this time, the inlet 30 is under high braking pressure, so that the armature 23 moves backward ahead of the seat plunger 27 due to a pressure difference between the inlet 30 and the outlet 31, and thus the first orifice 27a is opened.

Afterwards, a fluid flows through the first orifice 27a, and thus the pressure difference between the inlet 30 and the outlet 31 becomes below a predetermined level. In this case, the seat plunger 27 is raised by the second elastic member 28, and thus the second orifice 29a is opened. As a result, the inlet 30 is hydraulically, directly connected with the outlet 31, a large amount of fluid flows to the outlet 31. Thereby, the pressure of a hydraulic line side can be rapidly increased.

Figure 3:
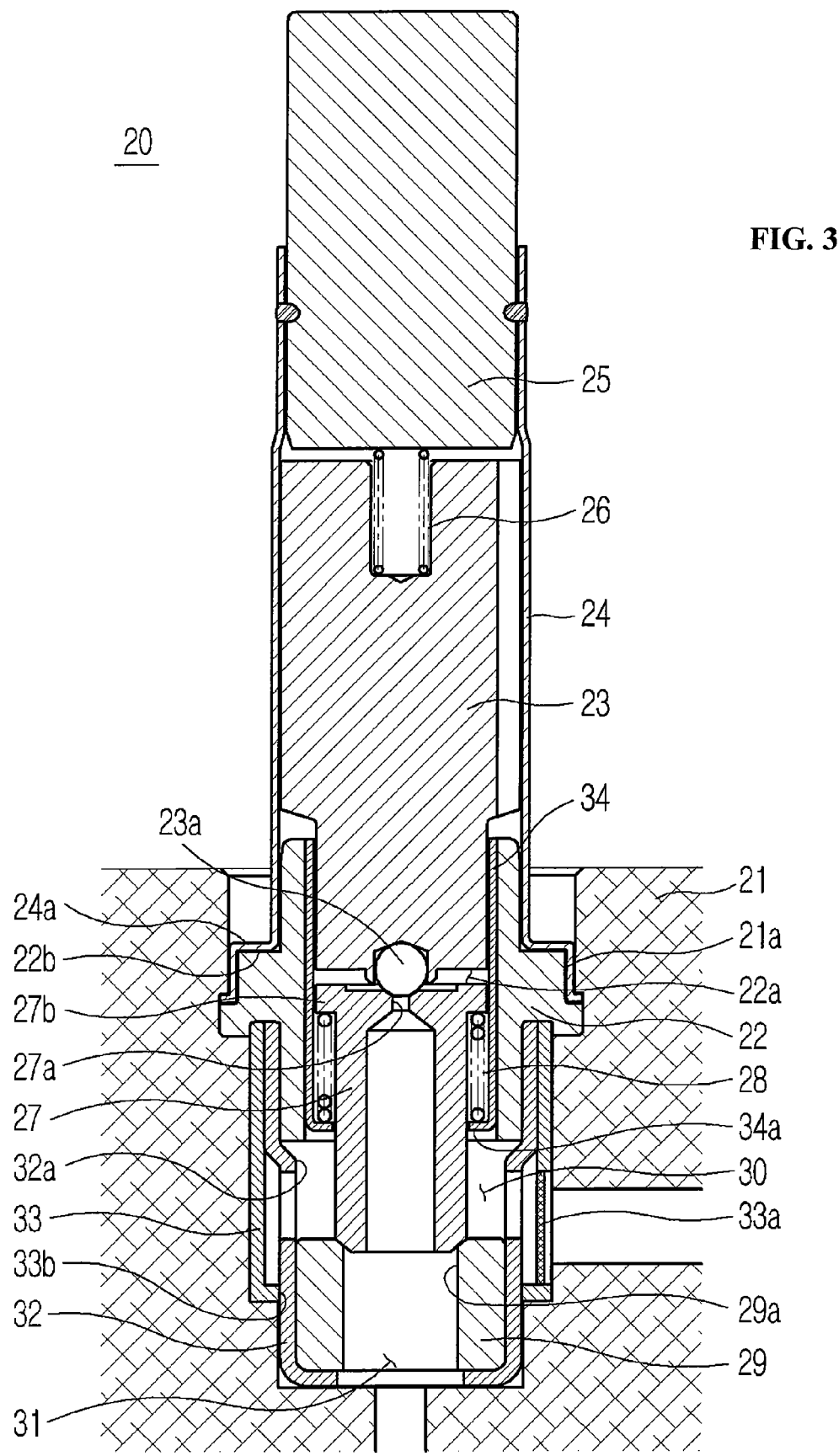
FIG. 3 is a sectional view illustrating the configuration of a valve for an anti-lock brake system according to a second embodiment of the present invention.

FIG. 3 is a sectional view illustrating a solenoid valve for an anti-lock brake system according to a second embodiment of the present invention. The second embodiment of FIG. 3 is different from the first embodiment of FIG. 2 in that a guide member 34 is added in order to install a second elastic member, and that a sleeve 24 and a valve housing 22 are coupled with each other by press-fitting rather than welding.

As illustrated, in order in order to install the second elastic member 28, a seat plunger 27 comprises a flange 27b at an upper end thereof, and the guide member 34 having a flange 34a is installed in a hollow space 22a. The flange 34a guides the seat plunger 27 so as to move backward and forward, and supports a lower end of the second elastic member 28.

The reason this guide member 34 is installed in the hollow space 22a is to allow a flange structure for supporting the second elastic member 28 to be eliminated from the valve housing 22 using the guide member 34 formed easily by forging to support the second elastic member 28, and to form the guide member 34 by an easier machining method, i.e. a forging method instead of omitting a cutting process for the flange structure. The installation of this guide member 34 is allowed to reduce the cost of production of the valve.

Further, the valve housing 22 has a step 22b on an outer circumference thereof, and the sleeve 24 coupled to the outer circumference of the valve housing 22 also has a step 24a. Thus, the sleeve 24 is not coupled to the valve housing 22 by welding as in the first embodiment, but it is press-fitted around the outer circumference of the valve housing 22.

The formation of the steps 22b and 24a is to determine an assembled position in this press-fitting structure, increase a contact area between the sleeve 24 and the valve housing 22, and secure assembling force. In the state in which the sleeve 24 is press-fitted around the valve housing 22, the valve housing 22 is press-fitted into a bore 21a.

Figure 4:
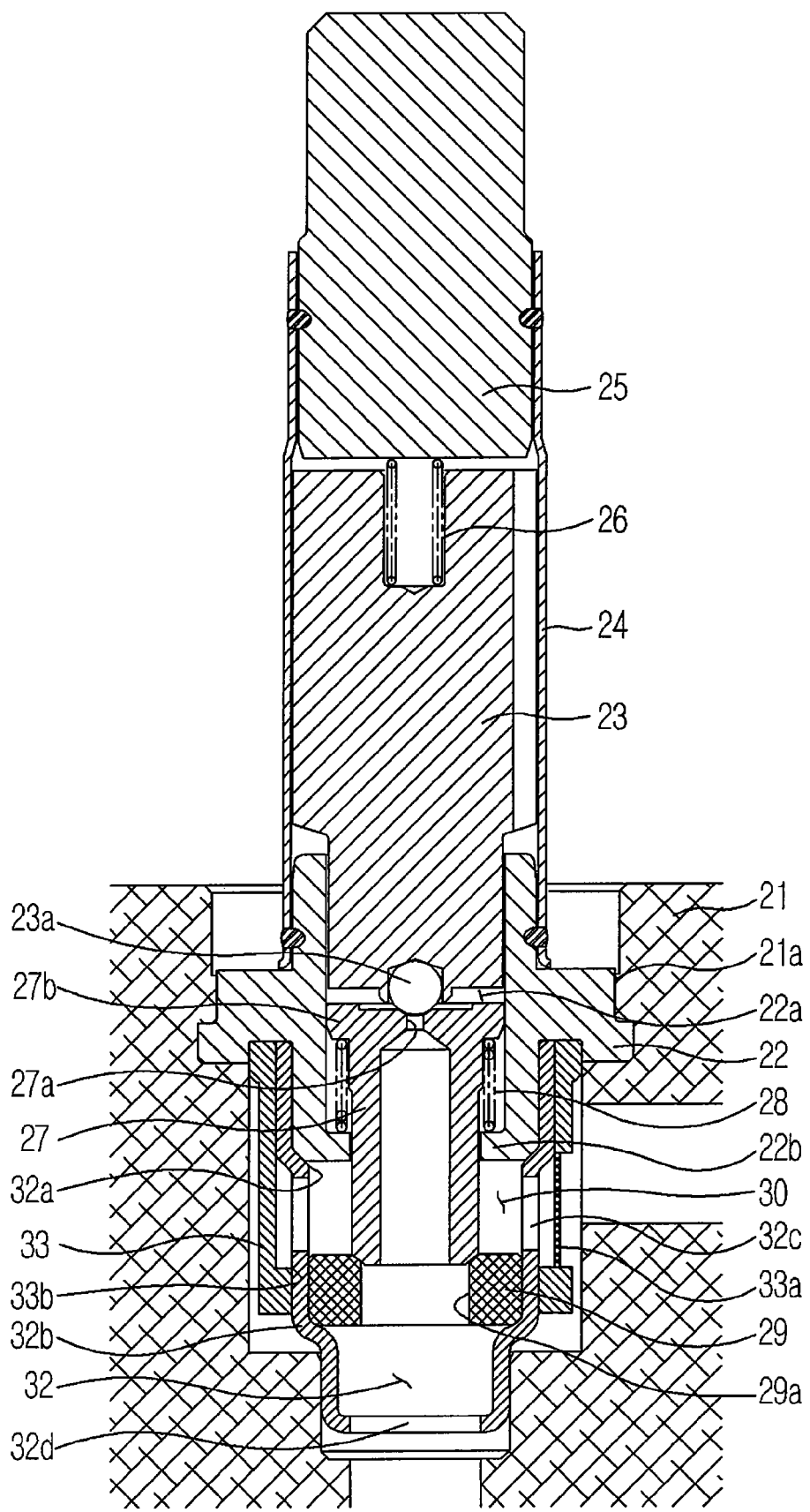
FIG. 4 is a sectional view illustrating the configuration of a valve for an anti-lock brake system according to a third embodiment of the present invention.

FIG. 4 is a sectional view illustrating a solenoid valve for an anti-lock brake system according to a third embodiment of the present invention.

The third embodiment is different from the first and second embodiments with regard to a coupling structure between a seat 29 and a seat housing 32 and between the seat housing 32 and a modulator block 21.

First, the lower end of a valve housing 22 is press-fitted into an upper end of the seat housing 32. In order to limit a press-fit depth of the valve housing 22, the seat housing 32 has a step 32a at an upper portion thereof. Due to the step 32a, a width of the seat housing 32 is reduced in a downward direction. The seat housing 32 further comprises another step 32b at a lower portion thereof. The step 32b is provided in order to couple the seat housing 32 with the seat having a second orifice 29a. The seat 29 is press-fitted into the seat housing 32. At this time, the seat 29 and the seat housing 32 may not be smoothly assembled due to various causes such as a machining tolerance or a change in dimension caused by a change in temperature. In order to overcome this problem regarding the assembling process, the step 32b is formed at the lower portion of the seat housing 32. The seat 29 is press-fitted through the step 32b, so that the seat 29 can be smoothly press-fitted into the seat housing 32 in spite of dimensional errors.

Further, the step 32b of the seat housing 32 helps enable the seat housing 32 to be smoothly press-fitted into the modulator block 21. In other words, when the seat housing 32 is coupled into the bore 21a of the modulator block 21, the step 32b is press-fitted at a stepped portion of the bore 21a. Thereby, the press-fitting force of the seat housing 32 is increased.

As described above, the valve for an anti-lock brake system according to the present invention comprises the valve housing, the seat installed below the valve housing, and the seat housing that is coupled on the outer circumferences of the valve housing and the seat and includes the inlet and the outlet.

Particularly, the seat housing can be easily machined by deep drawing, and be assembled with the valve housing and the seat in a manner such that the valve housing and the seat are press-fitted thereinto.

Further, the guide member having the flange for supporting the second elastic member is installed in the valve housing, so that the valve housing can be easily machined.

Thus, the valve housing can be designed in a compact structure, and the respective components can be easily assembled with each other, and be simplified in shape. As a result, a process of machining a complicated shape is omitted, so that the overall cost of production can be reduced.

Although few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A valve for an anti-lock brake system comprising:
   a valve core;
   an armature located below the valve core and having a ball at one end thereof;
   a cylindrical sleeve coupled to outer circumferences of the valve core and the armature and guiding the armature to move backward and forward;
   a first elastic member installed between the valve core and the armature;
   a valve housing coupled to one end of the sleeve and having a longitudinal hollow space therein;
   a seat plunger installed in the hollow space so as to be able to move backward and forward and having a first orifice opened and closed by the ball;
   a second elastic member installed between the seat plunger and the valve housing;
   a seat having an outlet and a second orifice that is opened and closed by the backward and forward movement of the seat plunger and communicates with the first orifice; and
   a seat housing coupled to a lower portion of the valve housing and an outer circumference of the seat, supporting the valve housing and the seat such that the valve housing and the seat are spaced apart from each other, and having an inlet between an upper end of the valve housing and a lower end of the seat,
   wherein the valve housing includes a first flange having a recess/groove formed in a bottom surface of the first flange, and the seat housing is press-fitted into the recess/groove, and
   wherein the seat and the valve housing are press-fitted into an inner circumference of the seat housing.

2. The valve as claimed in claim 1, wherein the seat housing comprises an inflow port and an outflow port connected with the inlet and the outlet in an outer circumference and at a lower portion thereof, respectively.

3. The valve as claimed in claim 1, wherein the seat housing comprises a step having a decreasing width such that the seat can be press-fitted into the seat housing.

4. The valve as claimed in claim 1, wherein the seat housing comprises a step for limiting a press-fit depth of the valve housing.

5. The valve as claimed in claim 1, wherein the seat plunger comprises a flange at an upper end thereof, and the valve housing comprises a second flange at a lower end thereof, in order to install the second elastic member.

6. The valve as claimed in claim 1, further comprising a guide member, which is installed in the hollow space, guides the seat plunger so as to be able to move backward and forward, and has a bent flange in order to install the second elastic member.

7. The valve as claimed in claim 1, wherein the seat housing is coupled with an inlet filter, which has a filter body for filtering a fluid introduced into the inlet, by press-fitting on an outer circumference thereof.

8. The valve as claimed in claim 7, wherein the seat housing and the inlet filter are press-fitted into a bore of a modulator block.

9. The valve as claimed in claim 1, wherein: the sleeve has a step on an inner circumference thereof; the valve housing has a step on an outer circumference thereof; and the sleeve is press-fitted around the outer circumference of the valve housing.

10. The valve as claimed in claim 5, wherein the second flange supports the second elastic member.

11. The valve as claimed in claim 5, wherein the second flange contacts the second elastic member.

* * * * *